United States Patent [19]
Whitsel

[11] 3,739,190
[45] June 12, 1973

[54] PART INTERROGATION SYSTEM
[75] Inventor: Jay F. Whitsel, Southhampton, Pa.
[73] Assignee: The Budd Company, Philadelphia, Pa.
[22] Filed: Dec. 6, 1971
[21] Appl. No.: 205,001

[52] U.S. Cl. ............................ 307/118, 200/81.9 R
[51] Int. Cl. ............................................ H01h 35/24
[58] Field of Search .................... 73/37, 37.5, 37.6, 73/37.7; 307/118; 340/236; 200/81.9 R

[56] References Cited
UNITED STATES PATENTS
2,944,558 7/1960 Dodge.................................. 137/82
3,509,898 5/1970 Monge et al....................... 137/81.5

Primary Examiner—Robert K. Schaefer
Assistant Examiner—M. Ginsburg
Attorney—Thomas I. Davenport, Edward M. Farrell, John D. Sowell et al.

[57] ABSTRACT

An interrogation system for indicating the presence or absence of a part or an aperture for a workpiece. An amplified pressure switch is positioned to receive a stream of air to indicate such presence or absence and then to control a power source to a machine tool depending upon the information.

4 Claims, 2 Drawing Figures

Patented June 12, 1973

3,739,190

INVENTOR.
JAY F. WHITSEL
BY
*A. L. Trucat Jr.*
ATTORNEY

PART INTERROGATION SYSTEM

This invention relates to an interrogation system and more particularly to an interrogation system for determining the presence of a part for a workpiece and controlling the power source to a machine tool intending to work on the part and workpiece.

In manufacturing operations on an automated production line, parts are often fed automatically to a machine tool for being attached to a workpiece. Some operations will damage the machine tool if a part is not positioned or improperly positioned for attachment to the workpiece during the attaching cycle. In some cases, the location of the part makes it difficult if not impossible to visually or physically check the presence of the part prior to cycling the machine tool.

It is an object of this invention to provide an interrogation system for determining the presence of a part to be attached to a workpiece.

Another object of this invention is to control the operation of a machine tool for attaching a part of a workpiece by means of this novel interrogation system by preventing operation of the machine tool if a part is not properly positioned for attachment to the workpiece and permitting operation when the part is properly positioned.

A further object of this invention is to provide a novel interrogation head for positioning adjacent an opening to determine if a spacer part is properly positioned in alignment with the opening.

These and other objects of this invention will become more apparent as reference is made to the following specification and accompanying drawings wherein.

Figure 2:
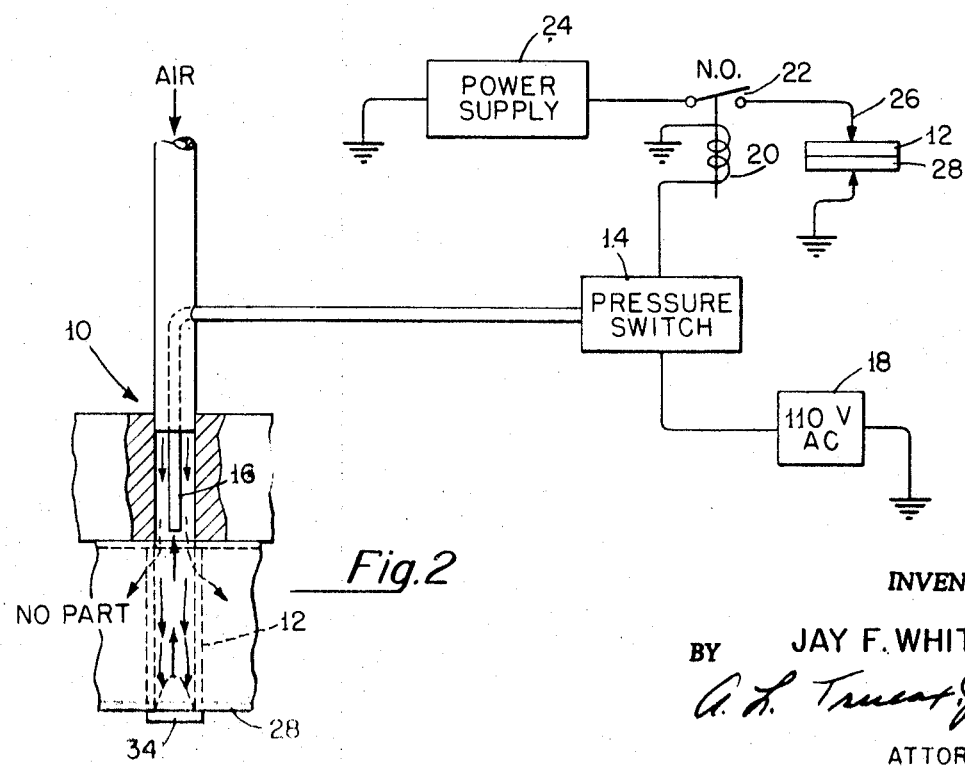
FIG. 2 is a schematic diagram of this novel interrogation system for indicating the presence of a part by the blockage of the air stream.

Referring now to the drawings, as seen in FIG. 2 the interrogation system shown schematically, consists of air under pressure directed through an interrogation head 10 against a part 12. The current of air is blocked by the part 12 and reflected back to the pressure switch 14 through collector tube 16, as shown by the solid lines. The pressure switch 14 interconnects a 110V AC power source 18 and a solenoid 20. In the schematic diagram shown, the solenoid 20 controls a normally open switch 22 that interconnects a power supply 24 and a machine tool 26 which in this instance is a welder (not shown) for joining the part 12 to a workpiece 28.

Figure 1:
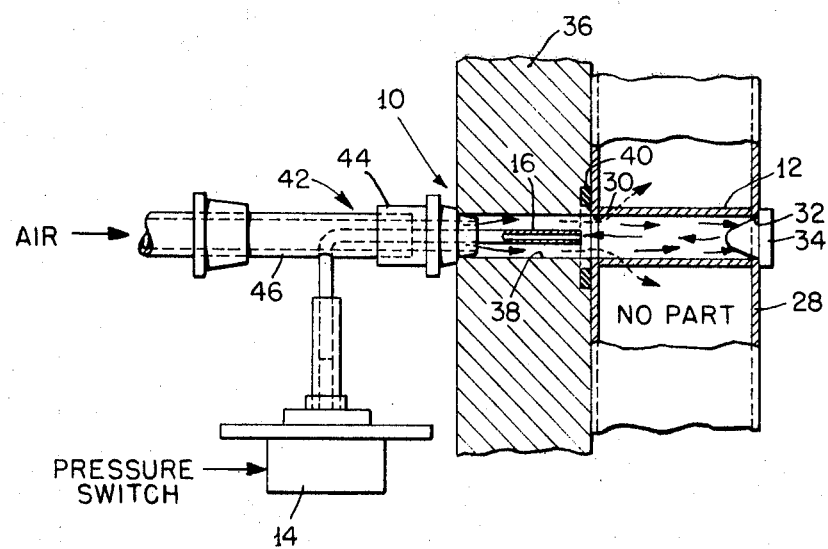
FIG. 1 illustrates a fixture arrangement for determining if a spacer is positioned within a workpiece prior to welding.

Referring to FIG. 1, the frame workpiece 28 includes a pair of aligned apertures 30, 32. The part 12 is a spacer member positioned within the frame 28 and aligned with the apertures 30, 32. The purpose of the interrogation system in this instance is to determine if the spacer 12 is properly positioned in alignment with the apertures 30, 32. A plug 34 is inserted in aperture 32 to block escape of the air therefrom.

The interrogation head 10 includes an adpater plate 36 having a passage 38 therethrough for alignment with aperture 30 of the frame 28. A sealing gasket 40 is attached to adapter plate 36 about one end of the passage 38 for contacting the frame 28 and preventing escape of the air therebetween. A nozzle assembly 42 is attached to the other end of passage 38 and includes a sleeve 44 adapted for insertion into passage 38 and for receiving the tube 46 delivering air under pressure to the system and the collector tube 16 positioned within the air tube 46.

In operation, the air under pressure flows through tube 46, passage 38 and aperture 30. If the spacer part 12 is properly located within workpiece 28 the pressurized air will be blocked by plug 34 and flow up collector tube 16 and actuate pressure switch 14. When pressure switch 14 is actuated, power source 18 is connected to solenoid 20 thereby closing the normally open switch 22 which connects the power supply 24 to the machine tool 26 permitting normal operation thereof.

If the spacer part 12 is not properly located the pressurized air will flow as indicated by the dashed arrows and escape from the system. The flow of the pressurized air past the collector tube 16 will not affect the pressure switch 14 and therefore the switch 22 will remain open preventing operation of the machine tool 26 until the spacer has been placed in position.

While the invention has been described and illustrated with respect to a preferred embodiment, it is to be understood that various changes and modifications may be made without departing from the scope of the following claims.

What is claimed is:

1. An interrogation system for determining the presence of a part to be joined to a workpiece by a power operated machine tool and for controlling the operation of said machine tool; said interrogation system including a pressure responsive switch for controlling said machine tool, a source of air under pressure, adapter means for connecting said source of air under pressure with said workpiece, means for directing said pressurized air against said part, means whereby said pressurized air is reflected by said part, a collector tube extending from said pressure responsive switch into said adapter means receiving said pressurized air reflected from said part and directing said pressurized air to said pressure responsive switch, and said pressure responsive switch being actuated by said pressurized air for controlling the operation of said machine tool.

2. The interrogation system as claimed in claim 1 wherein said adapter means includes an adapter plate having a passage therethrough for directing said pressurized air against said part, said collector tube positioned in said passage for receiving said pressurized air reflected from said part and delivering said pressurized air to said pressure responsive switch, and means for delivering said pressurized air to said passage.

3. The interrogation system as claimed in claim 2 wherein said delivering for said pressurized air includes a nozzle assembly adapted to be connected to said passage, an air tube leading from said source of air under pressure to said nozzle assmebly, and said collector tube entering the side of said air tube and extending parallel therein toward said part and into said passage for receiving the reflected pressurized air.

4. An interrogation system for determining the presence of a part to be joined to a workpiece by a power operated machine tool and for controlling the operation of said machine tool; said machine tool including a power supply, a switch having an open position and a closed position, said switch interconnecting said power supply and said machine tool, and a solenoid operably connected to said switch for moving said switch between said positions; said interrogation system including a source of power, a pressure responsive switch interconnecting said source of power and said solenoid, a source of air under pressure, an adapter plate connecting said interrogation system to said workpiece, a passage in said adapter plate, an air tube for delivering said pressurized air to said passage, a nozzle attached to said air tube and cooperating with said passage for directing said pressurized air through said passage to said workpiece, means whereby said pressurized air is reflected by said part, a collector tube extending from said pressure responsive switch into said air tube and extending parallel therein toward said workpiece, the end of said collector tube terminating in said passage for receiving reflected air from said part and directing said pressurized air to said pressure responsive switch, and said pressure responsive switch being actuated by said air for connecting said source of power to said solenoid for moving said switch between said positions and controlling the operation of said machine tool.

* * * * *